United States Patent
Hawlas

[11] Patent Number: 6,070,403
[45] Date of Patent: Jun. 6, 2000

[54] METHOD AND APPARATUS FOR FINE ADJUSTMENT OF MOVING PART SEQUENCES IN BALERS

[75] Inventor: Martin Hawlas, Harsewinkel, Germany

[73] Assignee: Usines Claas France, St. Remy/Woippy, France

[21] Appl. No.: 09/036,058

[22] Filed: Mar. 6, 1998

[30] Foreign Application Priority Data

Mar. 8, 1997 [DE] Germany .......................... 197 09 604

[51] Int. Cl.[7] .......................... A01D 39/00; A01D 43/02; A01D 75/00

[52] U.S. Cl. .................. 56/341; 56/434; 56/435; 56/445

[58] Field of Search ................. 56/432, 341, 35, 56/343, 434, 435, 445; 100/88

[56] References Cited

U.S. PATENT DOCUMENTS

| | | | |
|---|---|---|---|
| 4,838,108 | 6/1989 | Flanhardt et al. | 74/417 |
| 5,467,702 | 11/1995 | Naaktgeboren et al. | 56/341 |
| 5,752,374 | 5/1998 | Allworden et al. | 56/341 |
| 5,768,872 | 6/1998 | Von Allworden | 56/432 |
| 5,842,335 | 12/1998 | Esau | 56/341 |
| 5,899,054 | 5/1999 | Hawlas et al. | 56/341 |

FOREIGN PATENT DOCUMENTS

| | | | |
|---|---|---|---|
| 14 78 380 | 3/1967 | France | F16H 1/14 |
| 20 29 866 | 6/1970 | Germany . | |
| 2748594 | 3/1978 | Germany | 56/341 |
| 37 30 732 A1 | 9/1987 | Germany | B65B 13/18 |
| 39 13 496 C2 | 4/1989 | Germany | A01F 15/10 |

OTHER PUBLICATIONS

Operator's Manual, John Deere, Automatic Pickup Baler No. 14T, All pages, Jan. 11, 1956.

*Primary Examiner*—Robert E. Pezzuto
*Assistant Examiner*—Arpad Fabian Kovacs
*Attorney, Agent, or Firm*—Husch & Eppenberger, LLC; Robert E. Muir

[57] ABSTRACT

Method and apparatus for fine-adjustment of moving part sequences in big square balers and, in particular, for adjusting the insertion point of the needle bar and the timing of the feeding mechanism for the baling material. The fine-adjustment is accomplished by pivoting an angle adjustment mechanism, which is jointly pivotable with an intermediate drive shaft, at a maximum pivot angle of 10 degrees, but preferably 2 to 3 degrees in either forward or backward pivot directions.

13 Claims, 2 Drawing Sheets

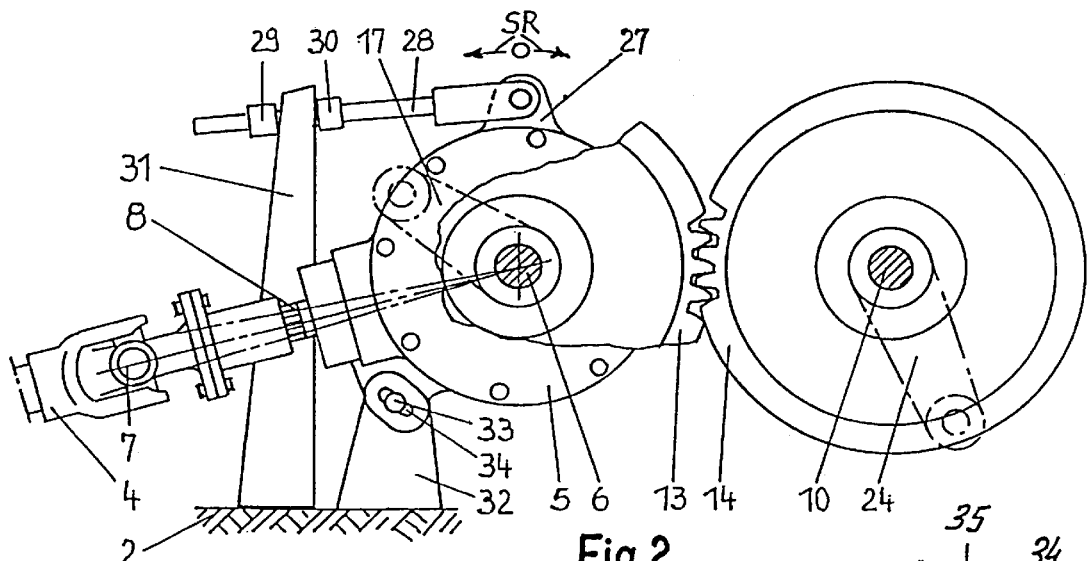
Fig.2
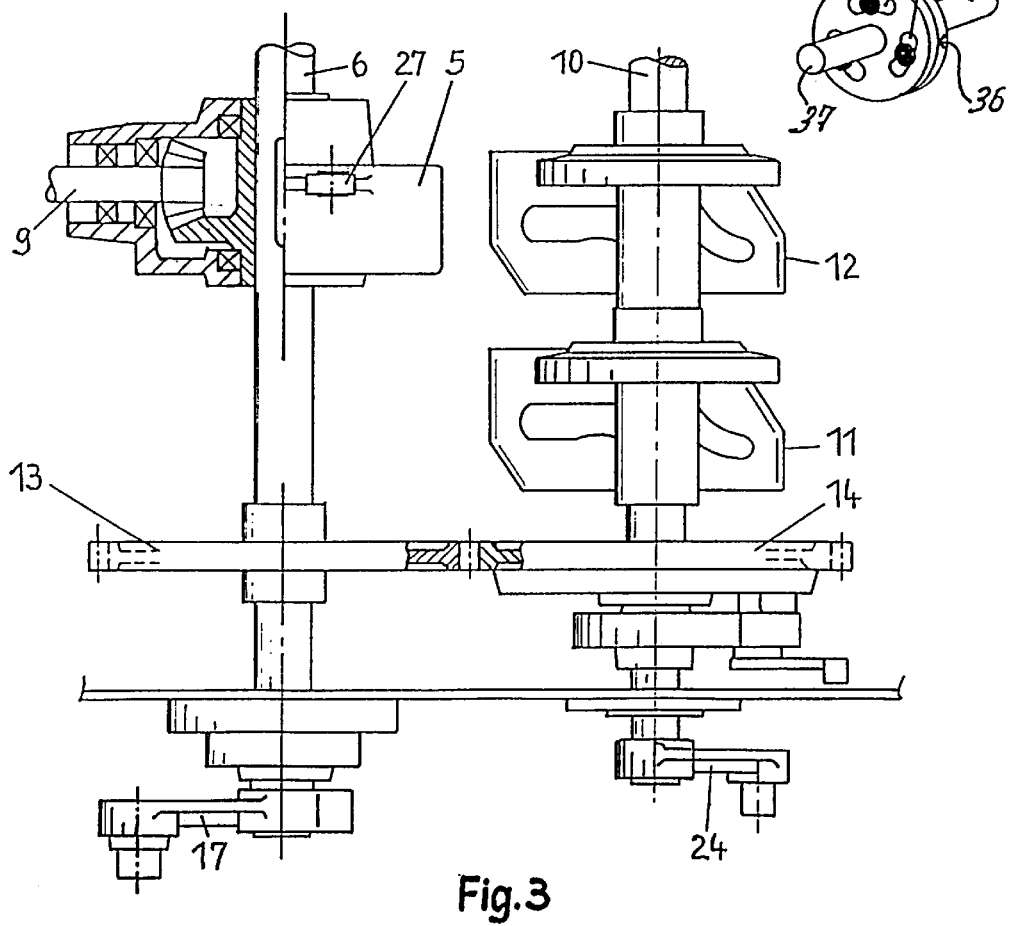
Fig.4
Fig.3

METHOD AND APPARATUS FOR FINE ADJUSTMENT OF MOVING PART SEQUENCES IN BALERS

BACKGROUND OF THE INVENTION

The present invention relates generally to baling machines, and more particularly to a method and apparatus for fine adjustment of moving part sequences in balers.

A big square baler has a knotter shaft driven by a main gear, a needle bar that is driven by at least one knotter shaft, and a feeding mechanism for the baling material that is driven by the main gear.

To guarantee problem-free operation and to avoid damage to the functional components of big square balers, the moving part sequences between the feeding mechanism, the baling ram, the needle bar and the knotter must be precisely coordinated. Problem-free operation necessitates an adjustment of moving elements during the machine assembly process and following certain operational intervals. With big square balers the synchronized actions can be adjusted by placing certain markers on the individual drive elements or on certain components. In certain positions, these markers have to take a pre-determined orientation relative to one another. The adjustment guide markers provide a means to coordinate the motion sequences of the individual functional elements. However, this method may not be sufficient in all cases to ensure optimum operability without further additional fine-adjustment mechanisms, especially when experiencing signs of tolerance and wear. In particular, knotter shafts driven via a roller chain, require corrective adjustments of the driving means after lengthy use due to wear.

For example, a fine adjustment between the baler ram and the needle bar is well known from DE-37 30 732 A1, where the roller chain tension is adjusted and the driven sprocket on the knotter shaft is pivoted, thereby changing the position of the needle tip towards the baler ram. However, such adjustment devices require additional elaboration. Furthermore, roller chain drives do not guarantee precise transmission ratios. While other well-known, higher-quality transmission means such as sprockets, gear boxes and universal drive shafts allow a more precise coordination of the moving elements relative to each other, they also require elaborate fine-adjustment devices.

SUMMARY OF THE INVENTION

It is an object of the present invention to perform the fine-adjustment of moving parts in a baler with less elaboration and higher accuracy.

In accordance with the present invention there is provided a method for fine adjusting moving part sequences in a square baler having a knotter shaft that is driven by a main gear, a needle bar that is driven by at least one knotter shaft, and a feed mechanism that is driven by the main gear; the method comprising the steps of: connecting the knotter shaft to an angle adjustment mechanism; and pivoting the angle adjustment mechanism in a forward or backward direction to adjust the angle of the knotter shaft and thereby adjusting the needle bar drive.

In accordance with another aspect of the present invention there is provided a method for synchronizing the insertion of a needle bar into a baler channel and the control of a feed mechanism for the bailing material including the steps of splitting the drive shaft and providing a flange interconnection, and fine adjusting the movements of the working mechanisms by pivoting at least one fixable flange position of the drive shaft toward the working mechanism to be synchronized.

In accordance with yet another aspect of the present invention there is provided an apparatus for fine-adjustment of moving part sequences in a baler including a main gear, a knotter shaft driven by the main gear, a needle bar driven by the knotter shaft, a feed mechanism driven by the main gear, and an angle adjustment mechanism connected to the knotter shaft for selectively adjusting the angle thereof.

The present invention provides a means to achieve precise synchronization of the individual motion sequences of the functional devices, resulting in lower operator and manufacturing involvement. This allows an optimum operation of a big square baler and prevents disturbances and damage of its components. The present invention also simplifies fine-adjustment of the big square baler's moving elements following service of the baler or exchange of drive components.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 2 is a side view of the knotter spur gear associated with the fine-adjustment device;

FIG. 3 is a top plan view of the knotter spur gear with the feed mechanism and needle bar drives; and FIG. 4 is a perspective view of a pivotable flange position of the drive shaft.

DETAILED DESCRIPTION

Figure 1:
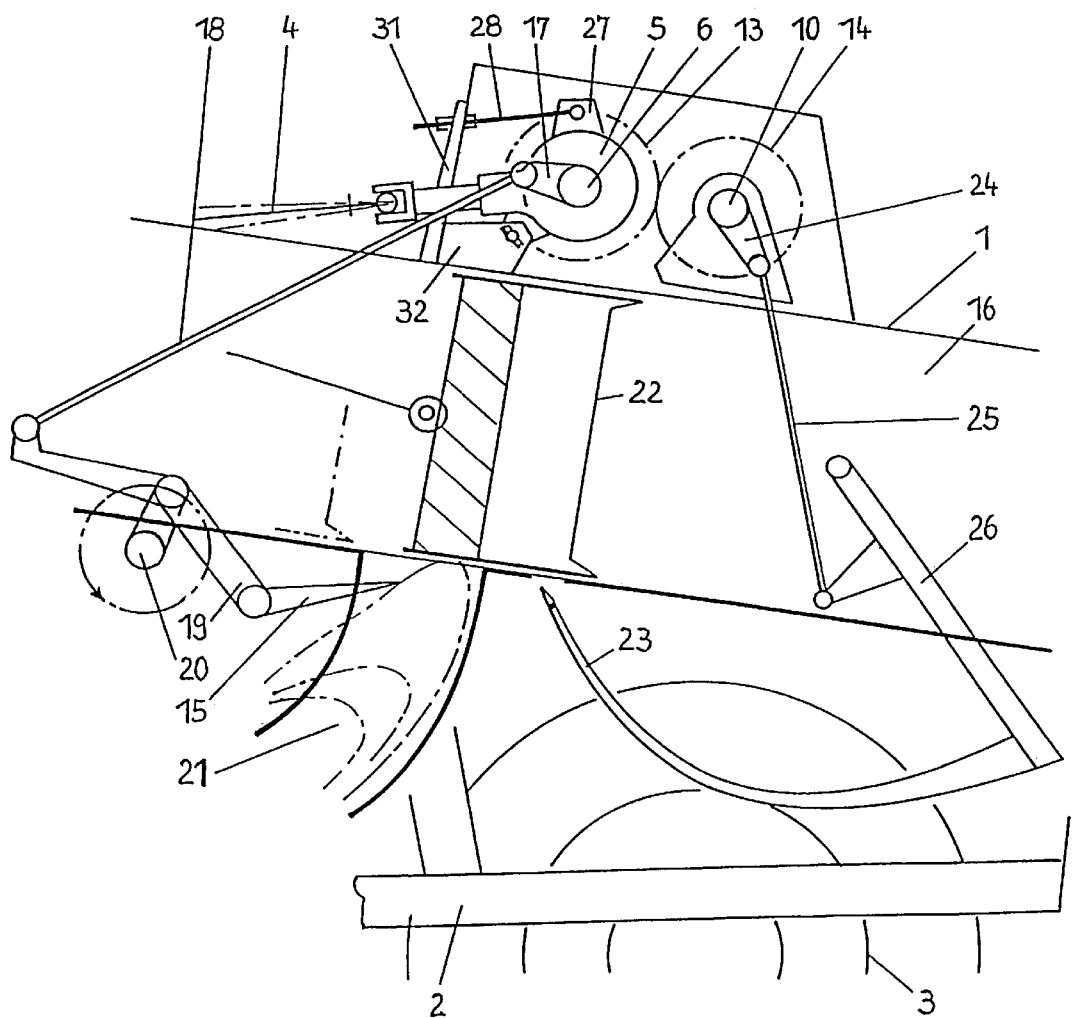
FIG. 1 is a partial side view of a baler, showing the feed mechanism and the needle bar drives.

A big square baler 1 has a pick-up device which feeds harvested crops into a baler channel 16 via the feed mechanism 15. In the baler channel 16 a bale ram 22 compresses the harvested crops into a crop bundle. The bundles are bound via the binding means and formed into individual big bales which are discharged by the big square baler onto the field, where they will be gathered and moved by a different means of transportation.

Different variations of the individual working mechanisms are known. For example, the feed mechanism may be a single or several curved-path controlled pilers or a single or several rotational feeders, with several rows of tines or controlled fingers. Also, the bale ram can be either oscillatorily-driven or comprised of a rotational feed screw. However, the different variations are not of further interest for understanding the embodiment of the present invention because it is believed to be applicable to all modifications of the working mechanisms.

The drive for the individual working mechanisms of a big square baler is generally derived from a main transmission, which directly or indirectly supplies the power for the individual working mechanisms. The illustrated example shows the big square baler 1 having a bale frame 2, wheels 3 and an intermediate drive shaft 6 which is driven by the baler's main drive via a universal drive shaft 4 and an angle adjustment mechanism 5. The upper universal joint 7 of the universal drive shaft 4 can be loosened by the longitudinal gear tooth 8 and connected to the entering shaft 9 of the angle adjustment mechanism 5. The mechanism 5 is mounted on the intermediate torsional drive shaft 6. A knotter shaft 10, on which knotters 11, 12 are mounted, runs parallel to the intermediate drive shaft 6. Meshed rotational spur gears 13, 14 are firmly mounted on the intermediate drive shaft 6 and the knotter shaft 10, respectively. The spur gears 13, 14 transfer rotational motion of the intermediate drive shaft 6 to the knotter shaft 10.

The intermediate drive shaft 6 also transfers power to the feed mechanism 15 for loading the crops into the baler channel 16. This is achieved by a crank arm 17 mounted onto one end of the intermediate drive shaft 6, which transfers the crank's motion to a revolving feeder shaft 20 via a control lever 18 and a crank lever 19. The feed mechanism 15 is connected to the crank lever 19. The motion of the feed mechanism 15 and its periodic circular path moves the compressed crops out of the feeder channel 21 and into the baler channel 16. The drive for the needle bar 23 is derived from the knotter shaft 10. The power from the knotter shaft 10 is transmitted to the needle bar 23 by a crank 24 mounted on the knotter shaft 10, a draw bar 25, and a rocker arm 26 on which the needle bar 23 is mounted.

To achieve the binding of the bale at the optimum time, the motions of the baling ram 22 and the needle bar 23 are synchronized with each other. The adjustment for this takes place during the assembly of the square baler 1 by positioning the moving parts of the functional components relative to each other in such a way that synchronous movement is generally achieved. After this adjustment, the universal drive shaft 4 is tightly connected to the mechanism 5. However, because this adjustment is not sufficient for the precise synchronization of the moving sequences for all the working mechanisms, in particular the insertion point of the needle bar 23 and the timing of the feed mechanism 15 in the feeder channel 21, an additional fine-adjustment is required. This additional fine-adjustment is accomplished by mounting the mechanism 5 on the intermediate drive shaft 6, pivotably at a maximum of 10 degrees, but preferably 2 to 3 degrees in both circumferential directions (i.e. forward and backward) as shown at SR in FIG. 2. The pivotable adjustment in both circumferential directions SR of the angular gear 5 is accomplished by a threaded link 28, connected to a boss 27. Adjusting nuts 29, 30 enable the torque link 28 to be positioned, relative to an upright support 31 mounted on the baler frame 2, in such a way as to achieve the desired pivot position of the angle adjustment mechanism 5. During the pivot adjustment of the mechanism 5, its entering shaft 9 (see FIG. 3) is advantageously secured by the universal drive shaft 4 to preclude possible twisting. The adjusted motion is transferred to intermediate drive shaft 6 and via the two spur gears 13, 14 to the knotter shaft 10. This ensures the adjustment of the needle bar 23 position and the feeding mechanism 15 in accordance with the appropriate adjustment requirements. The adjusted position of the mechanism 5 is further secured in the lower area by a bracket 32 mounted on the baler frame 2. This is accomplished by connecting a bracket 32 to the mechanism's housing and providing a lock screw 33, which can be loosened and tightened within an arcuate slot 34.

Even if the movements of the feeding mechanism 15 and the knotter shaft 10 are not directly connected with each other by intermediate drive shaft 6, as they are in the illustrated example, but are only indirectly connected to each other in the motion sequence via further interconnected driving means or independent drive means, the described principle of angular adjustment by an angle adjustment mechanism is still applicable in the sense of this invention. For example, the principle is applicable by either associating an angle adjustment mechanism 5 with the feed mechanism 15, or by associating an angle adjustment mechanism 5 with the knotter drive 10, or by mounting two mechanisms 5 to a correction angle.

A fine adjustment can also be accomplished if one drive shaft which transfers power to one of the synchronized working mechanisms, is split and has flanges where the firmly-mounted, pivotable drive shaft parts are connected and are pivotable relative to each other. A practicable example is shown in FIG. 4 where shaft stump portions 37, 38 have mating flanges 36. A screw bolt 35 is mounted firmly with the flange 36 and inserted through slots 34 which are arcuate for the pivoting motion. Drive shaft stump 38 in relation to drive shaft stump 37 is now pivotable along the length of the arcuate slots 34. If the drive shaft stump 37 is pivoted in relation to drive shaft stump 38 in the desired manner, the flanges 36 can be then secured by tightening nuts (not shown) on the screw bolts 35.

Other objects, features and advantages will be apparent to those skilled in the art. While preferred embodiments of the present invention have been illustrated and described, this has been by way of illustration and the invention should not be limited except as required by the scope of the appended claims.

I claim:

1. A method for fine adjusting moving part sequences in a square baler having a baler channel, a feeder channel communicating with the baler channel, a knotter shaft that is rotably driven by a main gear, a needle bar that is driven by the knotter shaft for movement into the baler channel, and a feed mechanism that is driven by the main gear for moving harvested crops into the feeder channel; the method including the steps of:

connecting the knotter shaft to an angle of rotation adjustment mechanism; and pivoting the angle adjustment mechanism in a forward or backward direction to adjust the angle of rotation of the knotter shaft and thereby adjusting the needle bar drive with respect to the main gear.

2. A method according to claim 1, wherein said last mentioned step includes synchronizing the insertion of the needle bar into the baler channel and the feed mechanism into the feeder channel.

3. A method according to claim 1, wherein said last-mentioned step includes pivoting the angle adjustment mechanism at a maximum angle of 10 degrees in either of the two pivot directions.

4. A method according to claim 1, wherein the feed mechanism driven by the main gear is accomplished by the steps of: driving said feed mechanism only by the main gear via the angle adjustment mechanism, and including fine adjusting the feed mechanism by pivoting said one angle adjustment mechanism.

5. A method according to claim 1, including driving both the feed mechanism and knotter shaft by the main gear via the angle adjustment mechanism, and fine adjusting the feed mechanism and the knotter shaft by pivoting said angle adjustment mechanism.

6. An apparatus for fine-adjustment of moving part sequences in a baler including a main gear, a knotter shaft rotatably driven by the main gear, a needle bar driven by the knotter shaft, a feed mechanism driven by the main gear, and an angle of rotation adjustment mechanism connected to the knotter shaft for selectively adjusting the angle of the rotation of the knotter shaft with respect to the main gear.

7. An apparatus according to claim 6, wherein said feed mechanism is connected to the main gear via the angle adjustment.

8. An apparatus according to claim 7, including a link connected to said angle adjustment mechanism for accomplishing a pivotable adjustment.

9. An apparatus according to claim 8, wherein said link is threaded and has adjusting nuts.

10. An apparatus according to claim 9, including a boss connected to the angle adjustment mechanism, and an upright support mounted to said bailer; and wherein the link extends between the boss and the upright.

11. An apparatus according to claim 10, wherein the baler includes a frame, and said support is firmly connected to the baler frame.

12. An apparatus according to claim 6, wherein said baler includes a frame and a bracket mounted to the baler frame below the angle adjustment mechanism.

13. An apparatus according to claim 12, wherein the angle adjustment mechanism has a housing, and including a lock screw for connecting said bracket to the housing.

* * * * *